No. 709,166.  
M. LOMBARDO.  
BANANA SHIPPING CRATE.  
(Application filed Mar. 17, 1902.)  
Patented Sept. 16, 1902.
(No Model.)
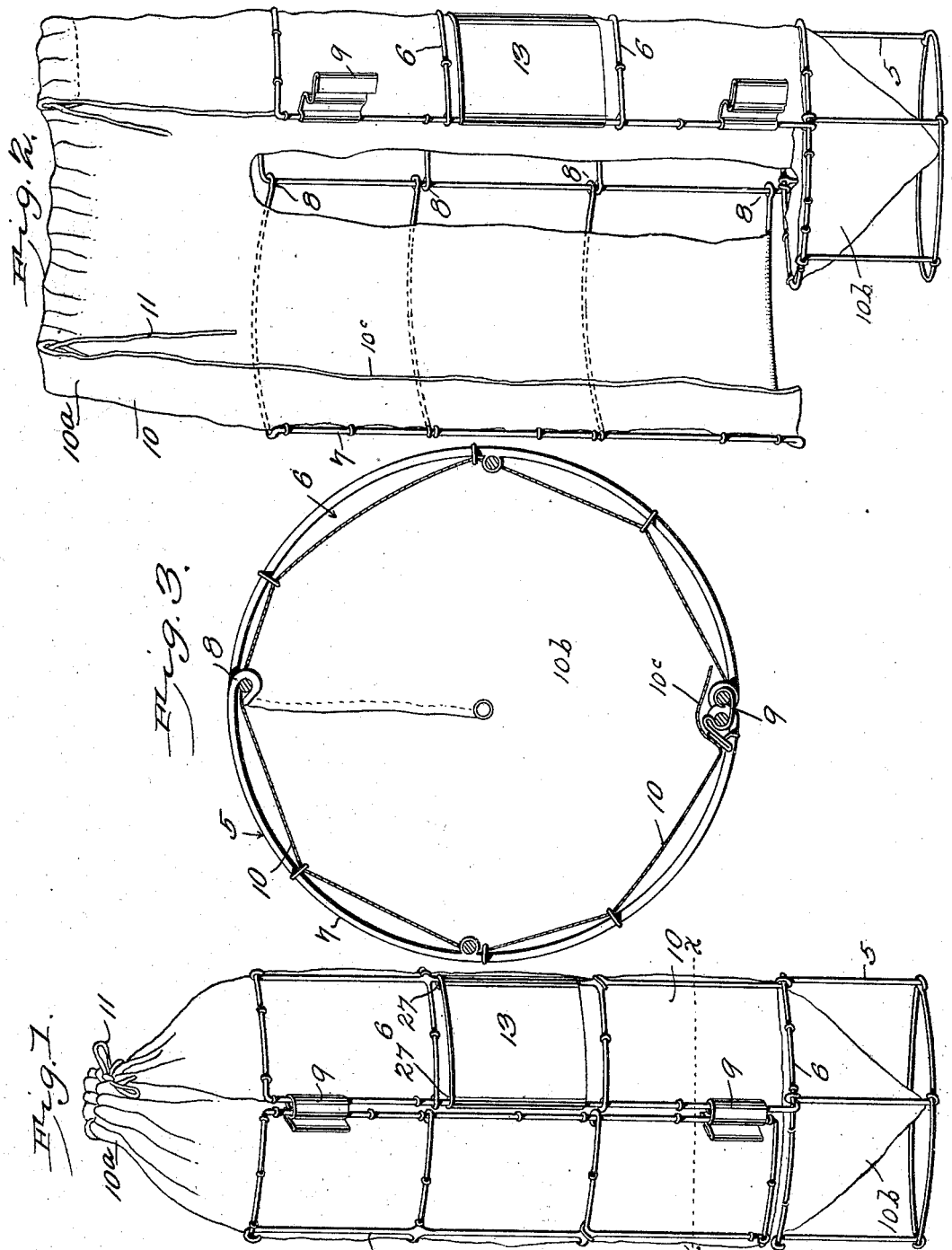

UNITED STATES PATENT OFFICE.

MICHELE LOMBARDO, OF MASON CITY, IOWA.

BANANA-SHIPPING CRATE.

SPECIFICATION forming part of Letters Patent No. 709,166, dated September 16, 1902.

Application filed March 17, 1902. Serial No. 98,579. (No model.)

*To all whom it may concern:*

Be it known that I, MICHELE LOMBARDO, a citizen of the United States, residing at Mason City, in the county of Cerro Gordo and State of Iowa, have invented a new and useful Banana-Shipping Crate, of which the following is a specification.

This invention relates to shipping-crates for the transportation of bananas; and it consists in a framework, preferably of wire, inclosing a lining of fabric and arranged to be opened out for the insertion or removal of the fruit and which will protect the bunches of bananas from injury and preserve them from decay.

In the drawings illustrative of the invention, Figure 1 is a perspective view of the crate complete and closed. Fig. 2 is a similar view showing the crate open. Fig. 3 is a cross-section, enlarged, on the line $x\ x$ of Fig. 1.

The inclosing framework consists of three principal parts, a short cylindrical section 5, a semicylindrical section 6, extending from said cylindrical section and composing a continuation thereof, and a semicylindrical section 7, conforming to the section 6 and connected thereto by hinged joints 8 on one side and by yieldable spring-catches 9 on the other side, as shown, the whole forming when united an elongated open-wire cylindrical cage, with the part 7 adapted to be opened outward, as shown in Fig. 2. Secured within the framework is a fabric envelop, (represented as a whole at 10 and conforming to the shape of the framework,) with one end extended, as at $10^a$, and with the other end formed conical, as at $10^b$, and supported within the circular portion 5, as shown. The fabric envelop 10 is divided along the detachable side of the portion 7 and is formed with a flap $10^c$, adapted when the device is closed to extend over and form a cover to the joint between the parts 6 7, as shown in Fig. 3. A gather-string 11 will be arranged in the extension $10^a$, as shown, so that the end of the fabric envelop may be drawn together to form a closure to the end of the envelop. By this simple means a bunch of bananas may be inclosed in the fabric envelop, the envelop closed around it, and the envelop, with the bunch of bananas inclosed thereby, supported free from other bunches or other objects and at the same time fully protected from dust, moisture, or cold.

The bunches of bananas are very easily inserted and removed from the crate and the crates easily handled in shipping. The bunches of bananas are also maintained separately, so as to insure complete ventilation, and all danger of crushing the fruit obviated. The fabric envelop being open and pervious admits the air freely, while at the same time excluding dust and moisture, thus tending to secure complete ventilation and consequent lessening of the chances for decay. The fabric employed will generally be coarse burlap or jute webbing; but any suitable fabric may be employed.

By slight and unimportant modifications the device might be adapted to shipping fruits or fragile goods other than bananas.

A plate 13 will be attached to the framework at some convenient point adapted to support the shipping-tags, or to be employed as a name-plate, or for the reception of advertising matter, &c. This plate is preferably secured in position by simply bending the edges thereof over two of the upright wires which constitute a part of the framework of the device, as shown at 27. This method of attachment is extremely simple, and the name-plate thus attached will not be easily lost, while it has the advantage of bracing and strengthening the adjacent parts of the framework.

While I have shown the framework of wire, I do not wish to be limited to any specific material or form of material, as metal in other shapes than wire may be employed, or wood may be substituted for metal, or it may be constructed partially of wood and partially of metal.

Having thus described my invention, I claim—

1. In a shipping-crate, a framework supported at one end, and consisting of two semicylindrical sections removably united longitudinally, a fabric envelop inclosed by said framework and having foldable ends and divided longitudinally, substantially as described.

2. In a shipping-crate, a framework formed of two semicylindrical sections removably united longitudinally, a fabric envelop inclosed by said sections and with foldable ends and divided longitudinally and with a longitudinal flap covering said division, substantially as described.

3. In a shipping-crate, a frame formed of a cylindrical end portion adapted to receive a portion of the contents and having a semicylindrical extension, and a semicylindrical portion removably engaging said cylindrical portion and semicylindrical extension, substantially as described.

4. In a shipping-crate, a framework formed of a cylindrical end portion adapted to receive a portion of the contents and having a semicylindrical extension, and a semicylindrical portion removably engaging said cylindrical portion and semicylindrical extension, and a fabric envelop inclosed by said framework, substantially as described.

5. In a shipping-crate, a frame formed of a cylindrical end portion having a semicylindrical extension, and a semicylindrical portion removably engaging said cylindrical portion and said semicylindrical extension, a fabric envelop inclosed by said framework with a conical extension at one end and foldable at the other end, substantially as described.

6. In a shipping-crate, a framework formed of a cylindrical end portion having a semicylindrical extension, and a semicylindrical portion engaging said cylindrical portion and semicylindrical extension, a fabric envelop inclosed by said framework having a longitudinal division on one side and provided with a flap adapted to form a closure to said division, substantially as described.

7. In a shipping-crate, a framework formed of a cylindrical end portion adapted to receive a portion of the contents and having a semicylindrical extension and a semicylindrical portion engaging said cylindrical portion and semicylindrical portion by a hinged joint on one side and yieldable catches on the other side, substantially as described.

8. In a shipping-crate, a framework formed of a cylindrical end portion having a semicylindrical extension and a semicylindrical portion removably engaging said cylindrical portion and semicylindrical extension, and a fabric envelop inclosed by said framework and having a conical extension at one end and foldable at the other end and with a longitudinal division between said ends, substantially as described.

9. In a shipping-crate a framework formed of two semicylindrical sections longitudinally united, a fabric envelop inclosed by said framework, and a name-plate upon said framework secured by bending the edges of said plate upon adjacent wires of the framework thereby bracing the latter, substantially as described.

In testimony that I claim the foregoing as my own I have hereto affixed my signature in the presence of two witnesses.

MICHELE LOMBARDO.

Witnesses:
  M. C. KOTCHELL,
  G. O. GOULD.